United States Patent [19]

Nichols et al.

[11] Patent Number: 4,848,045
[45] Date of Patent: Jul. 18, 1989

[54] ROOF EDGE STRUCTURES INCORPORATED WITH SINGLE-PLY POLYMER-COATED FABRIC ROOF STRUCTURES, AND METHODS OF MAKING AND ASSEMBLING THEM

[75] Inventors: Wayne G. Nichols, Bay City; John C. Greko, Saginaw; Francis R. Laurion, Vassar, all of Mich.

[73] Assignee: Duro-Last Roofing, Inc., Saginaw, Mich.

[21] Appl. No.: 197,580

[22] Filed: May 5, 1988

[51] Int. Cl.$^4$ .............................. E04D 13/15
[52] U.S. Cl. ........................ 52/60; 52/94; 52/96
[58] Field of Search ............ 52/58, 60, 59, 61, 62, 52/94, 96

[56] References Cited

U.S. PATENT DOCUMENTS

| | | | |
|---|---|---|---|
| 3,086,324 | 4/1963 | Cheney | 52/58 |
| 3,680,269 | 8/1972 | Fischer, Jr. et al. | 52/60 |
| 4,067,152 | 1/1978 | Wolma | 52/96 |
| 4,204,376 | 5/1980 | Calvert . | |
| 4,223,487 | 9/1980 | St. Clair | 52/94 |
| 4,254,594 | 3/1981 | Hammond et al. | 52/94 |
| 4,437,283 | 3/1984 | Benoit | 52/96 |
| 4,483,112 | 11/1984 | Rueblinger | 52/58 |
| 4,557,081 | 12/1985 | Kelly | 52/94 |
| 4,652,321 | 3/1987 | Greko | 52/58 |
| 4,665,667 | 5/1987 | Taylor et al. | 52/96 |
| 4,707,954 | 11/1987 | Butzen | 52/60 |

FOREIGN PATENT DOCUMENTS

| | | | |
|---|---|---|---|
| 603078 | 8/1960 | Canada | 52/58 |
| 1142411 | 2/1969 | United Kingdom | 52/60 |

OTHER PUBLICATIONS

Cooley Roofing Systems, Inc. publication of drawing M22.

Primary Examiner—Michael Safavi
Attorney, Agent, or Firm—Learman & McCulloch

[57] ABSTRACT

A single-ply, thermoplastic membrane roof construction includes, at its corners, a pair of right angularly disposed substantially rigid, edge, corner pieces welded together along a mitered joint by way of bringing a heating block into contact with the horizontal and vertical edges to be joined, and then converging the pieces to form the mitered corner which is fastened to the underlying roof structure. Strips formed of the same membrane fabric material as the roof covering membrane are welded to the horizontal upper walls of the edge pieces. Edge linear continuation strips are fastened in position to extend from the corner pieces, but with a gap between them and the corner-forming pieces. Clips mated to the configuration of the edge pieces and strips have portions at one of their upper and lower ends which snap into position to unite the spaced apart edge pieces.

15 Claims, 3 Drawing Sheets

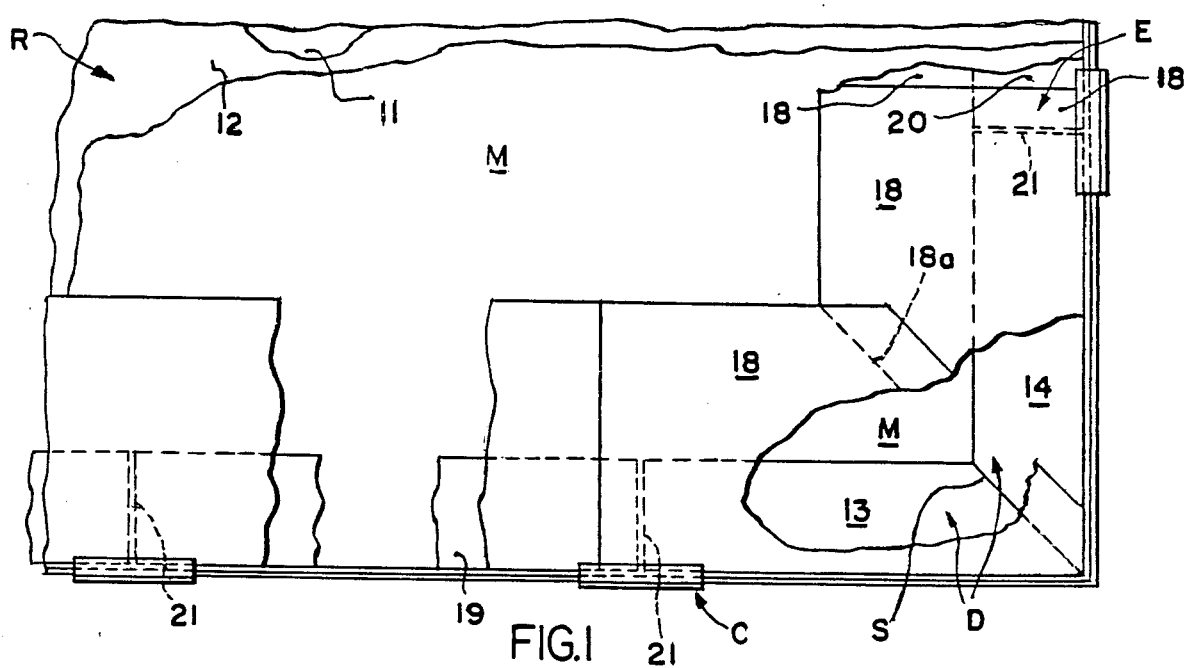
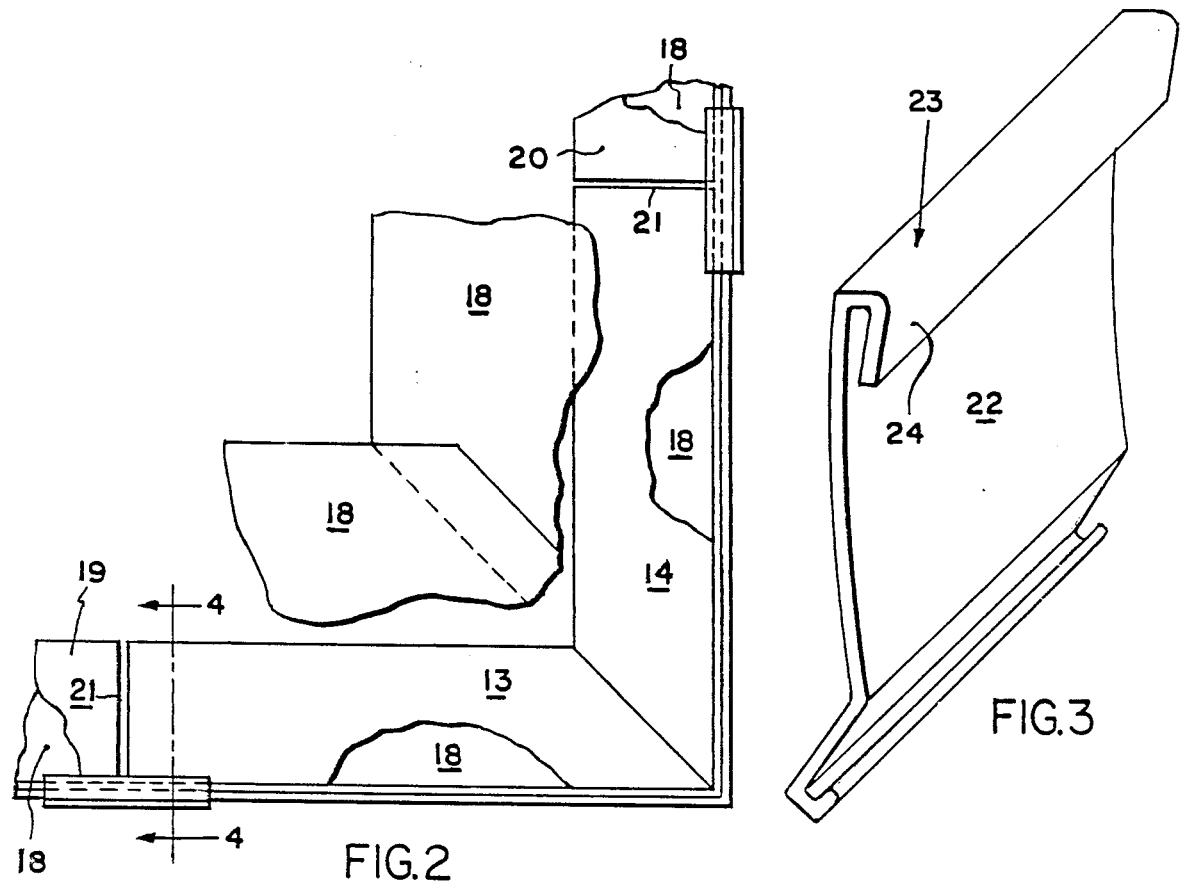

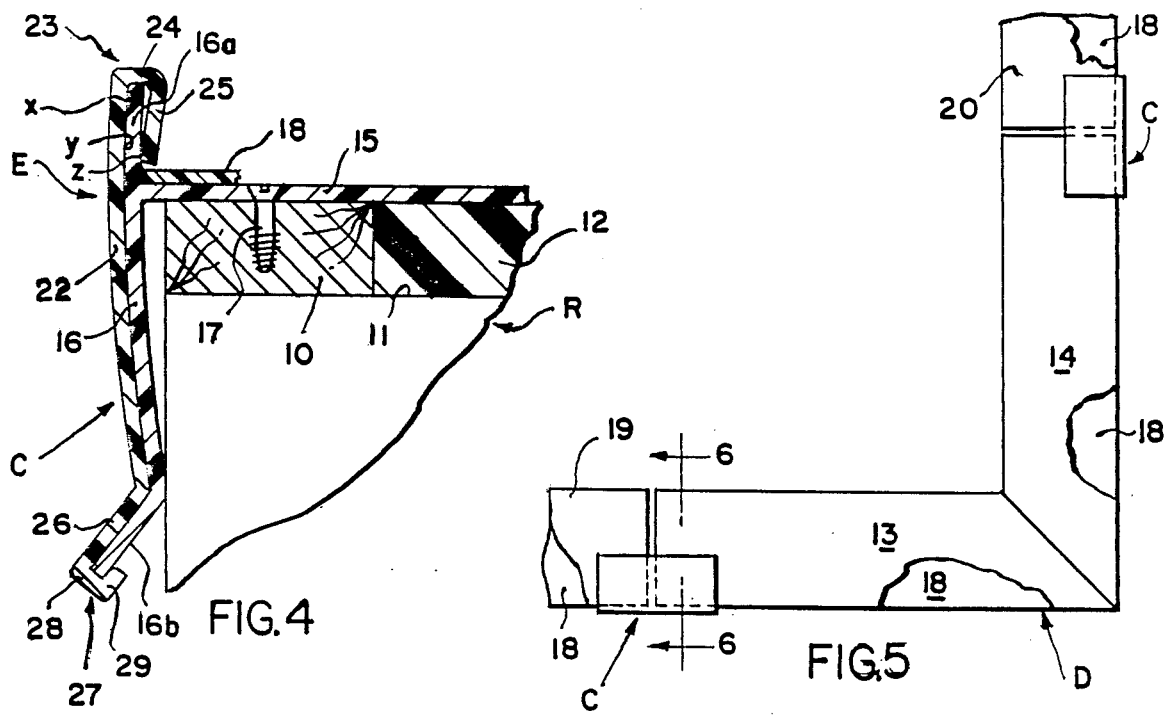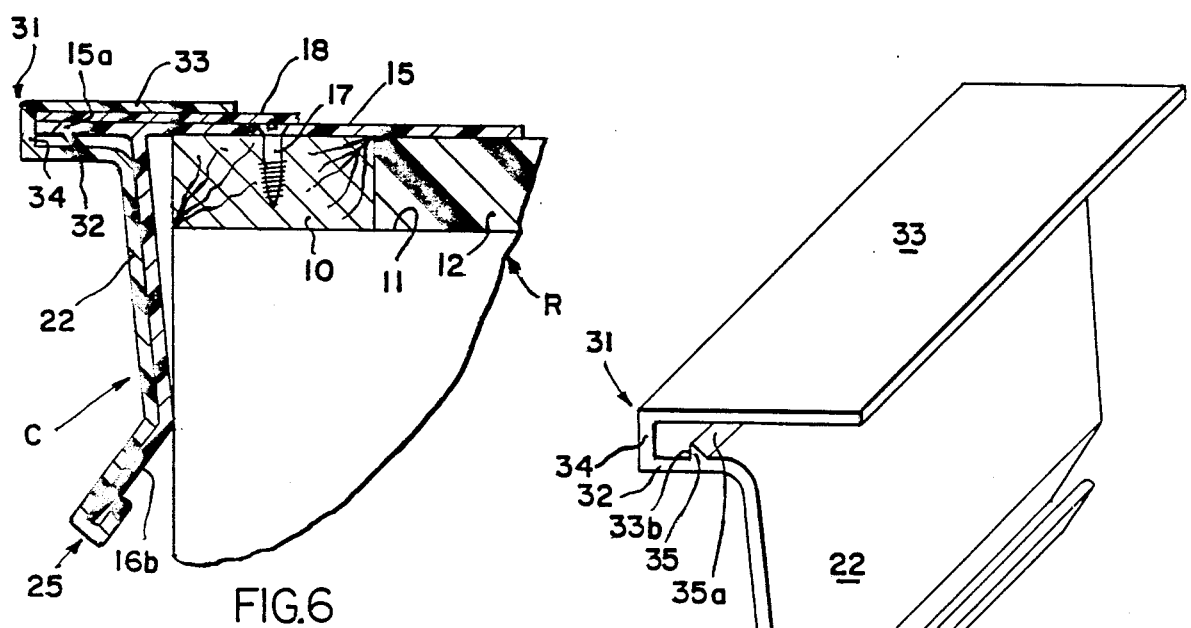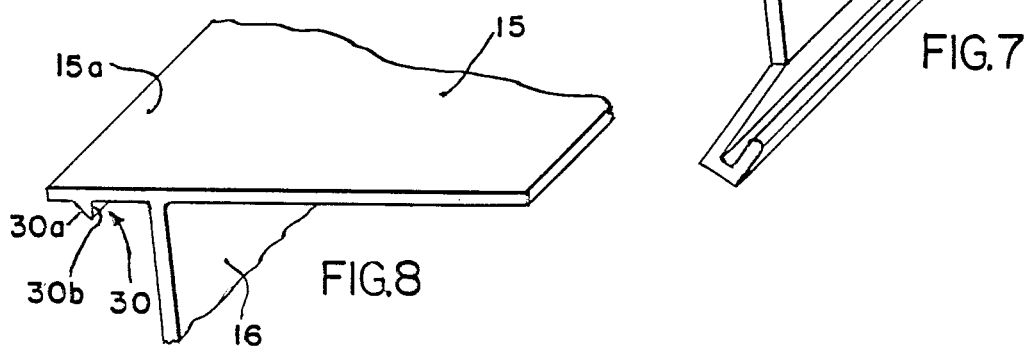

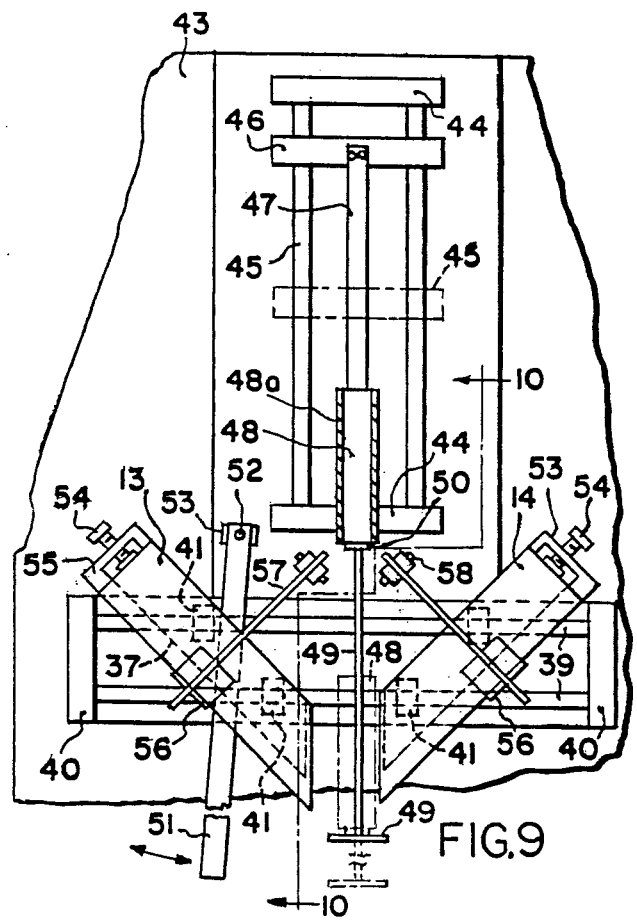
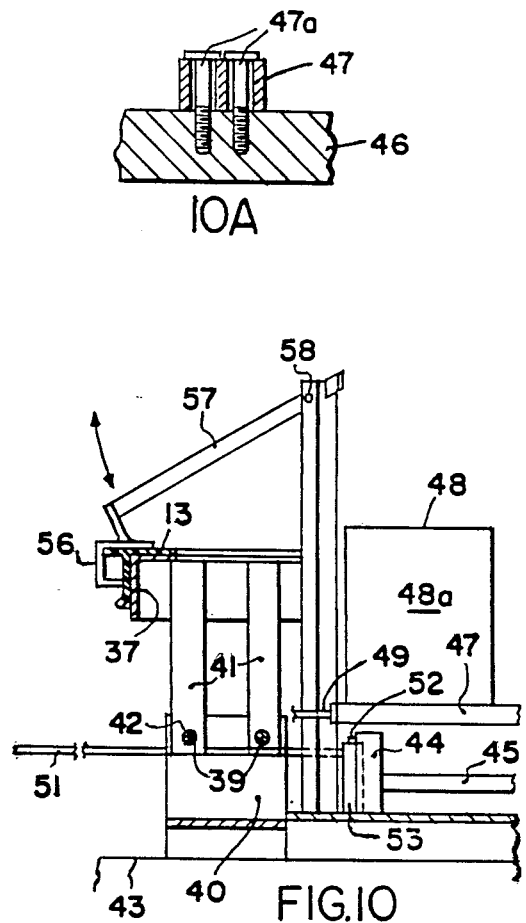
FIG.9
FIG.10A
FIG.10
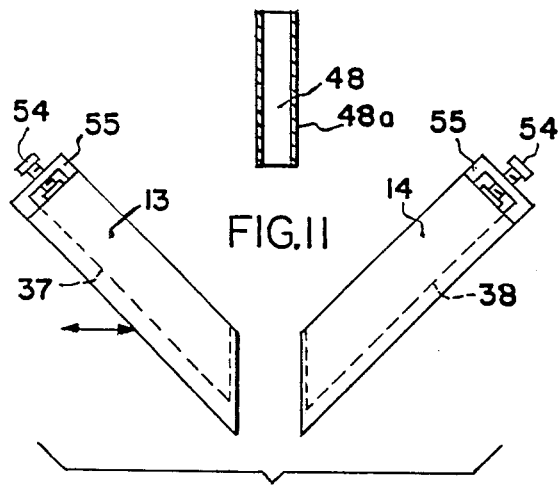
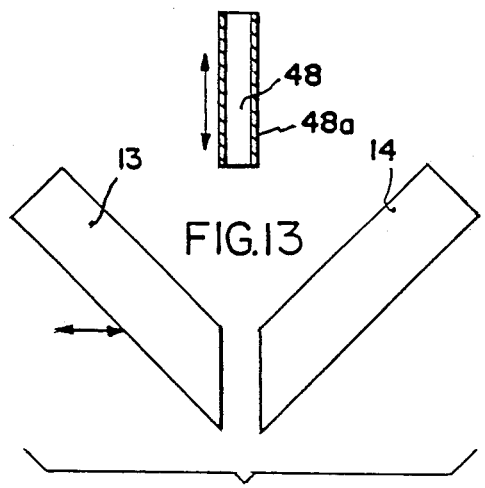
FIG.11
FIG.13
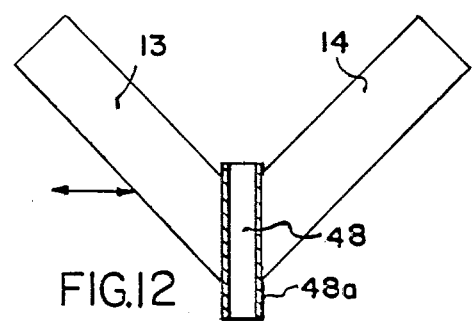
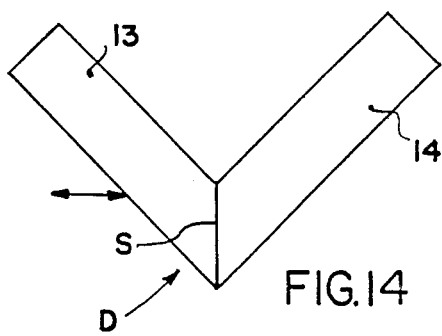
FIG.12
FIG.14

ROOF EDGE STRUCTURES INCORPORATED WITH SINGLE-PLY POLYMER-COATED FABRIC ROOF STRUCTURES, AND METHODS OF MAKING AND ASSEMBLING THEM

BACKGROUND OF THE INVENTION

The present invention is concerned with roof edge constructions for roofs incorporating one piece, single-ply roof covering membranes.

BACKGROUND OF THE INVENTION

Unitary, flexible plastic membranes which fit the contour of "minimum pitched" roofs are achieving ever-wider commercial acceptance today, and particularly polymer-coated fabric core membranes which are factory-fabricated on a custom basis to fit premeasured roofs, and then are shipped to the site in strip rolls which are heat-welded together at the site to form unitary leakproof membranes. Such membranes are frequently used in new construction over insulation material. They are also installed over existing roofing on flat, industrial roofs, for example, to provide a roof covering which is reliably sealed, and does not become stiff, inflexible, or cracked when subjected to weathering, ultra violet rays, abrasions, and microorganism attack. It has been conventional to form edge members which are sealed at their longitudinally abutting edges by caulking or mastic applied to the joints at the job site, but problems have been encountered because the members expand and contract with temperature changes and tends to pull away from the caulking.

SUMMARY OF THE INVENTION

The present invention is concerned with the formation and installation of substantially rigid, edge structures which are normally provided around the perimeter of such roofs. Like the welded flexible strip sections of the unitary membrane, these structures must be sealed in a reliable and leak-proof manner, and further must be sealed to the single-ply membrane in a reliable and leak-proof manner to prevent the entrance of moisture between the edge structure and membrane. The invention contemplates the provision of substantially rigid snap-on clip plates to bridge the gaps which are left between the adjacent edges of the non-collapsible edge sections to permit thermal expansion thereof. The clip plates, which, at the site, snap to a position over the membrane strips welded to the edge sections at the factory, are configured to mate with the contoured edge sections and retain the same basic appearance.

One of the prime objects of the present invention is to provide an improved method of forming reliably sealed edge constructions while presenting a very attractive appearance.

A further object of the invention is to provide an edge enclosing structure which is sufficiently strong and durable in nature that it will not fail when subjected to wind up-lift forces tending to raise the membrane.

Still another object of the invention is to provide an economically and simply fabricated edge structure which can be readily installed in place in the field by relatively unskilled workmen.

Still another object of the invention is to provide a edge strip and clip composite construction which snaps easily into assembled relation in the field.

Still another object of the invention is to provide an economical construction in which the edge strips and clips are formed of extruded thermoplastic plastic sections.

The edge structure includes corners, fabricated of a pair of extruded, angular, miter-cut, thermoplastic pieces which each have a generally horizontal top wall integrally joined to generally vertical side wall, the pieces being butt-welded at their matching, confronting, mitered edges. These pieces are formed by mounting them separately on spaced divergent templates, then disposing a heated block between the side edges of the pieces and converging the side edges into engagement with the sides of the block to melt and plastify the edges. Then the block is removed and the templates are further converged to bring the plastified edges into engagement and weld them together.

The mating clip strips hook over the upper portions of the terminal ends of the corners and the like upper portions of the edge strips which are adjacent to them, and further hook over the laterally outwardly extending lower flanges of the corners and the adjacent edge strips, in a snap-on action providing the utmost ease of installation.

Other objects and advantages of the invention will be pointed out specifically or will become apparent from the following description when it is considered in conjunction with the appended claims and the accompanying drawings.

IN THE DRAWINGS

FIG. 1 is a fragmentary, top plan view illustrating one corner of a single-ply membrane roof, which incorporates the novel edge structure, in place on a roof surface;

FIG. 2 is a slightly enlarged, top plan view of the edge corner structure, with clips shown as attached at the ends for the purpose of joining adjacent edge strips, and the membrane strips broken away;

FIG. 3 is a greatly enlarged, perspective, elevational view of one of the clips;

FIG. 4 is a sectional, elevational view, on an enlarged scale, taken on the line 4—4 of FIG. 2;

FIG. 5 is a top plan view, similar to FIG. 2, illustrating clips of a modified construction in place at the free ends of the edge corner;

FIG. 6 is an enlarged, sectional, elevational view, taken on the line 6—6 of FIG. 5;

FIG. 7 is a considerably enlarged, perspective, elevational view, illustrating the modified clip construction;

FIG. 8 is a fragmentary, perspective, elevational view of the upper end of the one of the edge strips;

FIG. 9 is a schematic top plan view of a system for joining and welding the confronting edges of the pieces which form the corner piece;

FIG. 10 is a sectional, elevational view, taken on the line 10—10 of FIG. 9;

FIG. 10A is a fragmentary, sectional elevational view illustrating the manner of the mounting the heating block which is employed to heat the confronting edges of the edge corner pieces; and FIGS. 11—14 are schematic top plan views, illustrating various steps in the fabrication process.

GENERAL DESCRIPTION

Referring now more particularly to the accompanying drawings, and in the first instance to FIGS. 1-4, a roof sub-structure, generally designated R, is disclosed as having a nailable, typically wood edge strip 10 around its perimeter, secured on a deck surface 11, and as having abutting insulation 12 which covers the top of the deck surface. As FIG. 1 particularly illustrates, this underlying roof structure is covered by a single-ply plastic membrane, generally designated M, comprising a fabric core having a polymer coating on each of its upper and lower faces, which may be of the character disclosed in the present assignee's U.S. Pat. No. 4,652,321.

What is termed a drip edge, gravel stop or facia is provided around the perimeter of the roof, and this edge structure is generally indicated at E. As FIGS. 1 and 4 particularly disclose, the edge structure E incorporates a corner, generally designated D, made up of a pair of right-angularly disposed linearly extending pieces 13 and 14 which are joined together along a mitered seam S (see FIG. 1). Each of the pieces 13 and 14 includes a top wall 15 integrally joined to a generally vertical contoured wall 16, which has a top edge 16a projecting above the wall 15, and an outwardly and downwardly angled lower flange 16b. The upper wall 15 is securely fastened to the roof structure, as, for instance, by providing screw fasteners 17, which at longitudinally spaced intervals extend down into the edge strip 10.

The upper wall 15 of each of the joined corner pieces 13 and 14, is provided with a membrane cover strip or skirt 18 of the same material as the membrane M, and, as disclosed in FIG. 1, the membrane 18 for the strip 13, laps the membrane 18 for the strip 14 at the corner seam S. The edge members 13 and 14 are typically polyvinyl-chloride extrusions, to which the membrane strips 18 are heat-welded at the factory. The strips 18, which have a polyvinylchloride composition outer coating on each face, will readily heat-weld to one another along bias cut, lapped portions 18a, and further readily heat-weld to the upper surface of the membrane M as shown in FIG. 1.

At the ends of corner pieces 13 and 14, identically contoured edges trips 19 and 20 of the same plastic material are respectively provided in slightly spaced relation to provide gaps 21, i.e. one inch, for the purpose of allowing thermal expansion. The linear members 19 and 20 have upper walls 15 and lower walls 16 which are identical to the similar walls of the pieces 13 and 14, and similarly have membrane strips or skirts 18 welded to their upper walls 15, which are positioned in lapped relation with the membrane strips 18 welded to members 13 and 14. These lapped membrane strips 18 are welded together in the field at the site during the installation process, when the strips 18 of the various members 13, 14, 19 and 20 are heat-welded to the membrane M.

Each of the gaps 21 is closed by a clip strip, generally designated C. The clips C may similarly be formed of an extruded polyvinylchloride plastic material, and the version disclosed in FIGS. 3 and 4 includes a generally vertical wall 22, generally shaped to the configuration of wall 16, which has a hook-shaped upper edge generally designated 23. Edge 23 consists of a horizontal web 24 integrally joining the wall 22 to a downwardly angled flange portion 25, which extends at a slight angle outwardly and downwardly toward the wall 22. Because the upper edge 16a of the wall 16 is more vertical along its outer surface x, than is the confronting counterpart inner surface y of the upper portion of wall 22, the effect, when the upper hook edge 23 of clip 22 is pushed down on edge 16a, is to effect a wedging action which spreads the resilient flange 25 from its normal position, and causes it to tightly grip the edge 16a at the surface z.

The lower edge of the clip wall 22 is formed with an outwardly extending flange 26, having a hook end, generally designated 27, comprised of joining web 28 and retaining edge 29. Once the hook end 23 is installed in position, the end 27 may be forced inwardly, with the result that the end 29 snaps past and over the flange 16b, the members 26 and 16b being sufficiently resilient to permit this to occur.

FIGS. 5–8 illustrate an alternate embodiment of edge members 13, 14, 19 and 20 which, for purposes of convenience, have been identified by the same numerals where the parts are identical. As FIGS. 6 and 8 particularly disclose, the various strips 13, 14, 19 and 20, in this form of the invention, differ in that no upper edge for the wall 16 is formed to extend above the top wall 15 and, rather, the wall 15 projects outwardly the wall 16 as at 15a. Provided on the lower surface of portion 15a, at a spaced distance inwardly from its outer edge as shown in FIG. 8 particularly, is a dependent bead, generally designated 30, which is provided with an inclined camming edge 30a, and a vertical retaining edge 30b.

Provided on the upper end of the wall 22, of the clip C disclosed in FIGS. 5–8, is a horizontal hook portion, generally designated 31, which includes an outwardly extending lower wall 32, internally joined to an upper wall 33 by a web portion 34 of predetermined height. Spaced a predetermined distance inwardly from the web 34, is a bead 35, having an inclined piloting wall 35a and a vertical retaining wall 33b. In the installation of this clip C, the horizontally hooked portion 31 is moved forwardly over the portion 15a and with engagement of the camming surfaces 35a and 30a, is resilient enough to snap under the bead 30 to the position indicated in FIG. 6. The lower hooked end 27 of this form of clip C will be installed in position over the flange 16b first of all. Each of the beads 30 and 35 extend the full length of the various strips 13, 14, 19 and 20, and the full lengths of the clips C, respectively. There are, of course, additional strips 19 and 20 joined to one another by clips C, dependent on the extent of the perimetral structure E to be formed.

THE METHOD OF FORMING THE CORNERS

FIGS. 9 and 10 particularly illustrate apparatus which may be used to join the edge corner pieces 13 and 14. In these figures, the formation of corner pieces having a configuration of the character disclosed in FIGS. 5, 6 and 8, is illustrated. FIG. 9 shows a pair of edge pieces 13 and 14, arranged in spaced-apart, convergent relation on a pair of convergent templates 37 and 38, members 13 and 14 in FIG. 9 being shown only in chain lines.

The template 37 is mounted for travel on a pair of guide rods 39, fixed between a pair of end walls 40 by means of vertical supports 41 having slide openings 42 through which the guide rods 39 extend. The template 38 may similarly be supported from the rods 39 by means of supports 41, which are fixed in position on rods 39. End walls 40 form part of a frame, fixed to a table 43, or the like, which also has fixed end walls 44, mounting a pair of guide rods 45 along which a carriage 46 travels.

Carriage-carried support 47 mounts an aluminum heating block 48 which as embedded block heating wires connected to a suitable source of electrical power. The block 48 further is preferably provided with a removable teflon sheath 48a covering its side walls. Support 47 is connected to carriage 46 by screws 47a received in oversize bores in support 47 so that a slight pivot of member 47 is permitted for a purpose which will be described (see FIG. 10A). A handle rod 49 is connected to the lower end of support 47 by an insulated coupling 50, and has a handle 49 which can be pulled forwardly to dispose the block 48 between the templates 37 and 38, as indicated by the chain lines in FIG. 9. Lever 51, which is pivotally mounted at 52 on a block 53 fixed to table 43, can be swung to the right in FIG. 9 about pivot 52 to engage one of the straps 41 connected to template 37, and move the template 37 into a more convergent relationship with respect to template 38.

FIGS. 11-14 indicate the method of operating the apparatus disclosed in FIGS. 9 and 10 for effecting the weld. In the "ready" position, as FIG. 11 illustrates, the edge pieces 13 and 14 have been disposed in position on the templates 37 and 38. Stop screws 54, mounted on blocks 55 carried by the templates 37 and 38 engage and maintain the pieces 13 and 14 in position when the pieces 13 and 14 are being welded. Channel-shaped clamp members 56 (FIG. 10), connected to arms 57, which can be swung upwardly about pivots 58, are provided for clamping the edge pieces 13 and 14 in position on the templates 37 and 38.

In FIG. 12, the heated block 48 is shown as having been moved forwardly to a position of adjacency with edge piece 14, after which handle 51 is moved to the right in FIG. 9 to move the opposite side of heating block 48 to engage piece 13 (FIG. 12). The block 48 can pivot slightly to the right to permit it to engage the confronting edge of piece 14. Typically, the block 48 may be maintained at a temperature (such as 450° F.) sufficient to heat the identical confronting edges of the strips 13 and 14 almost immediately (about 40 seconds) to a plastic condition. The next step, as shown in FIG. 13, is to remove the block 48 back to original position via the handle rod 49. As the block 48 slides rearwardly the most liquid portion of the melt beads formed on each confronting edge of the corners pieces 13 and 14 is wiped away from the exterior sides of the corner pieces toward the interior sides. Thereafter, further rightward movement of the lever 51 will fully converge the thermoplastic strips 13 and 14 with sufficient force to cause the plasticized confronting edges of the walls 15 and 16 to weld securely together along seam S, with the more liquid material having been wiped toward the interior faces of strips 13 and 14, so that the bead of excess plastified material m forms at the interior of the seam S (FIGS. 2 and 5) and is not visible when the corner is installed. The fabric strips 18 can be welded to pieces 13 and 14 prior to the time they are placed on templates 37 and 38, or after the pieces are welded together.

THE OPERATION

With the corner pieces 13 and 14 formed in the manner just described, the first step in installation of the edge E is to fasten the upper edges 15 of the pieces 13 and 14 firmly in position via screws 17. At this point, the adjoining strips 19 and 20 are placed in position, with their membrane strips 18 lapping the strips 18 of the corner pieces 13 and 14, and as indicated, a gap 21 will be left between the pieces 13 and 19, and 14 and 20. The strips 19 and 20 are also secured via screws 17, the faces 15 similarly having been provided with screw openings to facilitate this.

Dependent on the version of corner pieces 13 and 14 which has been utilized, either of the different clips C will be utilized in centered relation with respect to the gaps 21. The manner of snapping these clips C into position has previously been described and will not be repeated. Following this, the membrane strips 18 will be welded together at their lapped joints, and also welded to the membrane M which they overlie. The edge structure E thus reliably seals the roof deck around its perimeter, and provides an attractive appearance.

While the embodiments of the invention have been described in detail, it will be apparent to those skilled in the art that the disclosed embodiments may be modified. Therefore, the foregoing description in all aspects is to be considered exemplary, rather than limiting in any way, and the true scope of the invention is that defined in the following claims.

What is claimed is:

1. A roof construction incorporating flexible, single ply, thermoplastic plastic-coated, fabric membrane material overlaid on a roof deck comprising:
    a. a synthetic plastic corner member consisting of a pair of generally rigid linear corner pieces joined to form a right angle, each piece having a relatively horizontal top wall and a generally vertical side wall fitted to the edge of a roof deck, with the top wall abutting the top surface of the deck and the side wall overlying the side wall of the deck, at a corner thereof;
    b. continuation strips of the same cross-sectional configuration as said pieces, with top and side walls, and disposed to form continuations of said pieces, separated from said pieces by gaps;
    c. lapped membrane skirts welded to the top walls of the corner pieces;
    d. a roof covering membrane welded to the skirts to form a unitary one-piece roof deck cover;
    e. each of the vertical side walls of the corner pieces and continuation strips having a projecting upper flange vertically spaced from an outwardly and downwardly projecting lower flange;
    f. clip strips, each comprising a vertical wall with an upper loop portion receiving said upper flanges of the corner forming pieces and continuation strips, and a lower loop portion extending outwardly and downwardly to receive the said lower flanges, joining said strips and pieces and covering said gaps; and
    g. the upper flanges of the corner pieces and continuation strips projecting horizontally outwardly from the side walls of the corner pieces and the upper loop portions of the clips being horizontal.

2. The invention defined in claim 1 wherein the relative angles of said lower flanges and lower clip loops are such that the lower clip loops are a snap fit on the lower flanges.

3. The invention defined in claim 1 wherein said upper flanges have a dependent bead, and an upstanding bead is situated within the upper loop portions of the clips to be snapped behind the beads on the upper flanges.

4. The invention defined in claim 3 wherein said beads on the upper loop portions of the clips and upper flanges have vertically inclined piloting surfaces.

5. A roof edge member comprising:
    a. mitered, heat weldable, thermoplastic, synthetic plastic corner pieces consisting of a pair of linear pieces extending relatively perpendicularly to form a right angle corner, each piece having a substantially horizontal top wall and a generally vertical side wall and adapted to be fitted to the edge of a roof deck, with the top wall abutting the top surface of the deck and the side wall overlying the side wall of the deck at a corner thereof, the two pieces being butt-welded along a 45° seam; and b. heat weldable partially lapping, thermoplastic plastic coated fabric membrane skirts, with adjacent skirts being lapped at ends thereof forming a corner and welded to the top walls of the pieces, the skirts extending beyond said top walls to be able to lap a like roof membrane member and be heat weldable thereto.

6. The invention defined in claim 5 wherein each of the vertical side walls has a projecting upper flange vertically spaced from an outwardly and downwardly projecting lower flange.

7. The invention defined in claim 6 wherein said upper flange projects vertically.

8. The invention defined in claim 6 wherein said upper flange projects horizontally and a bead is formed on the under surface thereof interjacent the edges of the said upper flange.

9. The member of claim 5 wherein the skirts welded to the two pieces have lapped edges cut along substantially a 45° bias to substantially align with said seam.

10. The member of claim 5 wherein said pieces each comprise a vertical wall with a projecting upper flange vertically spaced from an outwardly and downwardly projecting lower flange.

11. The member of claim 10 wherein said upper flange projects horizontally outwardly from the vertical wall, and has a vertically projecting lock bead thereon.

12. The member of claim 10 wherein said upper flange extends vertically above said top wall.

13. A roof construction incorporating flexible, single ply, thermoplastic plastic-coated, fabric membrane material overlaid on a roof deck comprising:

a. a, synthetic plastic corner member consisting of a pair of heat weldable, thermoplastic, generally rigid, mitered, linear corner pieces joined to form a substantially right angle, each piece having a mitered relatively horizontal top wall and a mitered generally vertical side wall fitted to the edge of a roof deck, with the top wall of each abutting the top surface of the deck and the side wall of each overlying the side wall of the deck, at a corner thereof, the two pieces having matched vertical side walls of the same cross-sectional configuration, with a projecting upper flange vertically spaced from an outwardly and downwardly projecting lower flange, which are joined along a heat welded 45° seam;

b. continuation strips of the same cross-sectional configuration as said pieces and disposed to form continuations thereof, separated from said pieces by gaps;

c. lapped membrane skirts heat welded to the top walls of the corner pieces and continuation strips, and projecting therefrom with adjacent skirts being lapped at ends thereof forming a corner;

d. a roof covering membrane welded to the projecting portions of said skirts to form a unitary one-piece roof deck cover; and e. clip strips, each comprising a mating vertical wall and top wall, joining said strips and pieces and covering said gaps.

14. The construction of claim 13 wherein said clip strips snap fit into position and have upper loop portions receiving the upper flanges of the corner forming pieces and continuation strips, and have loop portions extending downwardly and outwardly to receive the said lower flanges.

15. The construction of claim 14 wherein said upper flanges project horizontally outwardly from said vertical walls and said upper loop portions are horizontal, there being interlocking vertically projecting beads an said upper flanges and horizontal loop portions.

* * * * *